(12) United States Patent
Tomezzoli et al.

(10) Patent No.: US 12,024,374 B2
(45) Date of Patent: Jul. 2, 2024

(54) MOVEMENT DEVICE FOR MOVING ROLLER BOXES

(71) Applicant: SYSTEM CERAMICS S.P.A., Fiorano Modenese (IT)

(72) Inventors: Matteo Tomezzoli, Sassuolo (IT); Pier Luigi Bompani, Castelnuovo Rangone (IT); Andrea Annovi, Corlo di Formigine (IT)

(73) Assignee: SYSTEM CERAMICS S.P.A., Fiorano Modenese (IT)

( * ) Notice: Subject to any disclaimer, the term of this patent is extended or adjusted under 35 U.S.C. 154(b) by 275 days.

(21) Appl. No.: 17/639,643

(22) PCT Filed: Oct. 20, 2020

(86) PCT No.: PCT/IB2020/059854
§ 371 (c)(1),
(2) Date: Mar. 2, 2022

(87) PCT Pub. No.: WO2021/090099
PCT Pub. Date: May 14, 2021

(65) Prior Publication Data
US 2022/0297952 A1 Sep. 22, 2022

(30) Foreign Application Priority Data
Nov. 4, 2019 (IT) .................. 102019000020304

(51) Int. Cl.
*B65G 47/90* (2006.01)
*B65G 41/00* (2006.01)
(Continued)

(52) U.S. Cl.
CPC ........... *B65G 47/90* (2013.01); *B65G 41/001* (2013.01); *B65G 47/00* (2013.01); *B65G 47/04* (2013.01);
(Continued)

(58) Field of Classification Search
CPC ...... B65G 47/90; B65G 41/001; B65G 47/00; B65G 47/04; B65G 47/52; B65G 47/54;
(Continued)

(56) References Cited

U.S. PATENT DOCUMENTS

| 1,491,771 A | * | 4/1924 | Fuller | B65G 49/085 |
| | | | | 414/280 |
| 1,549,499 A | * | 8/1925 | Parker | B65G 47/54 |
| | | | | 193/35 MD |

(Continued)

FOREIGN PATENT DOCUMENTS

| CN | 212930948 U | * | 4/2021 | ............. B65G 47/00 |
| DE | 3320737 A1 | | 12/1983 | |

(Continued)

*Primary Examiner* — James R Bidwell
(74) *Attorney, Agent, or Firm* — Pearne & Gordon LLP; J. Gregory Chrisman (57) ABSTRACT

A movement device for moving roller boxes, comprising: a support frame (10), movable along a vertical direction; a conveyor plane (11), solidly constrained to the support frame (10) with respect to the movement in a vertical direction and movable with respect to the support frame (10) along a horizontal transversal direction (X), in which the conveyor plane (11) is predisposed to translate objects (O) along a horizontal conveying direction (Y); three operating arms (21,22,23), solidly constrained to the support frame (10), each of which is provided with spindles (S) rotating about rotation axes which are coplanar, horizontal and perpendicular to the conveying direction (Y). A main arm (21) is provided with motorised spindles (S) and is movable along the transversal direction (X) between a first operating position and a second operating position, to selectively interact with one of two roller boxes (B1,B2).

19 Claims, 5 Drawing Sheets

(51) Int. Cl.
*B65G 47/00* (2006.01)
*B65G 47/04* (2006.01)
*B65G 47/54* (2006.01)
*B65G 47/64* (2006.01)

(52) U.S. Cl.
CPC ............ *B65G 47/54* (2013.01); *B65G 47/642* (2013.01); *B65G 2201/025* (2013.01); *B65G 2814/0313* (2013.01)

(58) Field of Classification Search
CPC .......... B65G 47/642; B65G 2814/0313; B65G 2201/025
USPC .............................................. 198/348, 468.8
See application file for complete search history.

(56) References Cited

U.S. PATENT DOCUMENTS

| | | | | |
|---|---|---|---|---|
| 3,006,485 | A | * | 10/1961 | Martin ................... B65G 67/00 104/98 |
| 5,292,221 | A | * | 3/1994 | Fenander ............. B65G 49/085 414/609 |
| 2013/0341158 | A1 | * | 12/2013 | Yang .................... B65G 49/064 198/409 |
| 2016/0159585 | A1 | * | 6/2016 | Wernersbach ....... B65G 54/025 198/619 |

FOREIGN PATENT DOCUMENTS

| | | | |
|---|---|---|---|
| EP | 0301231 A1 | 2/1989 | |
| EP | 0445695 A2 | 9/1991 | |
| EP | 0999158 A1 | 5/2000 | |
| EP | 1203737 A1 | 5/2002 | |
| IT | 1190308 B | 2/1988 | |
| IT | M020100267 A1 | 3/2012 | |
| WO | WO-2016207789 A1 * | 12/2016 | .......... B65G 49/085 |

\* cited by examiner

MOVEMENT DEVICE FOR MOVING ROLLER BOXES

The present invention relates to a movement device for moving roller boxes.

In ceramic tile production lines it is necessary, at some steps of the process, to be able to interrupt the continuous flow of tiles, creating buffers or temporary storage warehouses both before and after the outlet of the kiln. These temporary warehouses are obtained by means of roller boxes which comprise a plurality of roller planes. The roller planes are superimposed on each other. Both the raw material input from the glazing line or the press and the fired material output from the kiln are stored on the roller planes.

The roller boxes are managed in special storage stations. A storage station is configured to handle two adjacent roller boxes, alternatively intended for loading or unloading raw or fired material. Two boxes are normally used to ensure the continuity of operation in the production process. In fact, while one roller box is loading or unloading material, an empty or full roller box can be introduced or extracted in the adjacent station.

In the currently available storage stations, in order to load or unload each plane of the roller boxes, a motorised roller plane is used, mounted on a vertically and horizontally movable crossbar to be able to position itself freely at the height of each plane of the roller boxes, and thus be able to transfer the material from one plane of the roller box to the line or vice versa.

To motorise a plane of the roller boxes, movement devices are currently used which comprise a plurality of motor spindles, mounted on arms vertically and horizontally movable along specific guide uprights. In practice, there are two vertically movable arms for each roller box, which go up to the height of the plane to be motorised (for loading or unloading) and connect to the rollers displacing themselves horizontally, lifting them and activating them in rotation. Normally there are four movable arms, two for each roller box, and they are movable vertically and horizontally in pairs on each two roller boxes.

The movement devices currently available are relatively heavy and cumbersome. In fact, the two pairs of arms provided with motorised spindles have a substantial weight, which requires the adoption of adequate motor means. In addition, the two pairs of arms require a dual spindle motorisation system, to allow the independent drive of the roller planes of the two flanked roller boxes.

The aim of the present invention is to offer a movement device for moving roller boxes which allows to simplify the currently available movement devices.

Features and advantages of the present invention will more fully emerge from the following detailed description of an embodiment of the present invention, as illustrated in a non-limiting example in the accompanying figures, in which.

Figure 1:
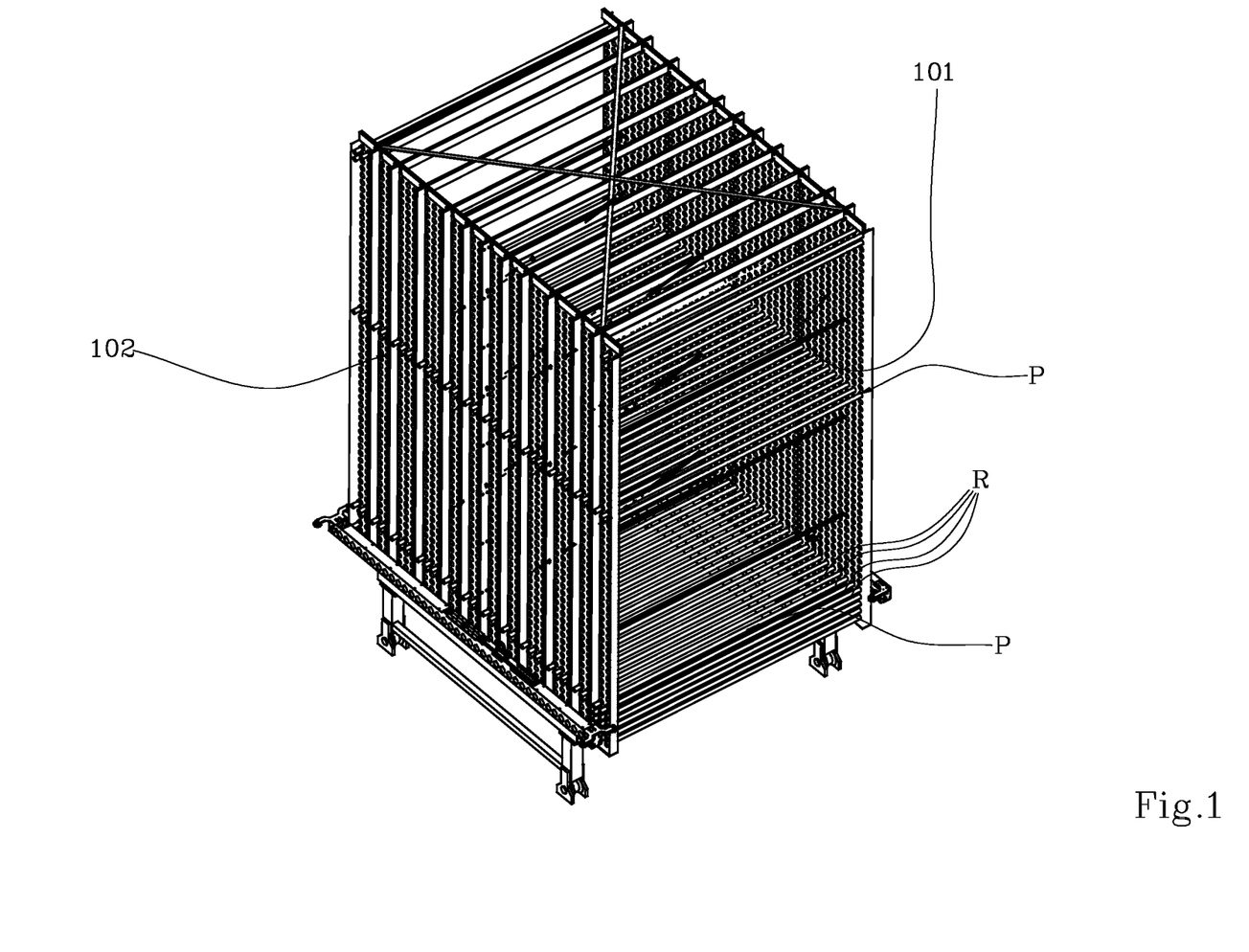
FIG. 1 is an isometric and schematic view of a roller box.

The movement device according to the invention is particularly suitable for the management of roller boxes of the type shown in FIG. 1. The roller box comprises two side walls (101, 102) vertical and parallel to one another. The side walls (101,102) are held in place and coupled to each other by crossbars and/or tie rods, and are associated with a base frame for ground support, in a manner known in the art.

Figure 4:
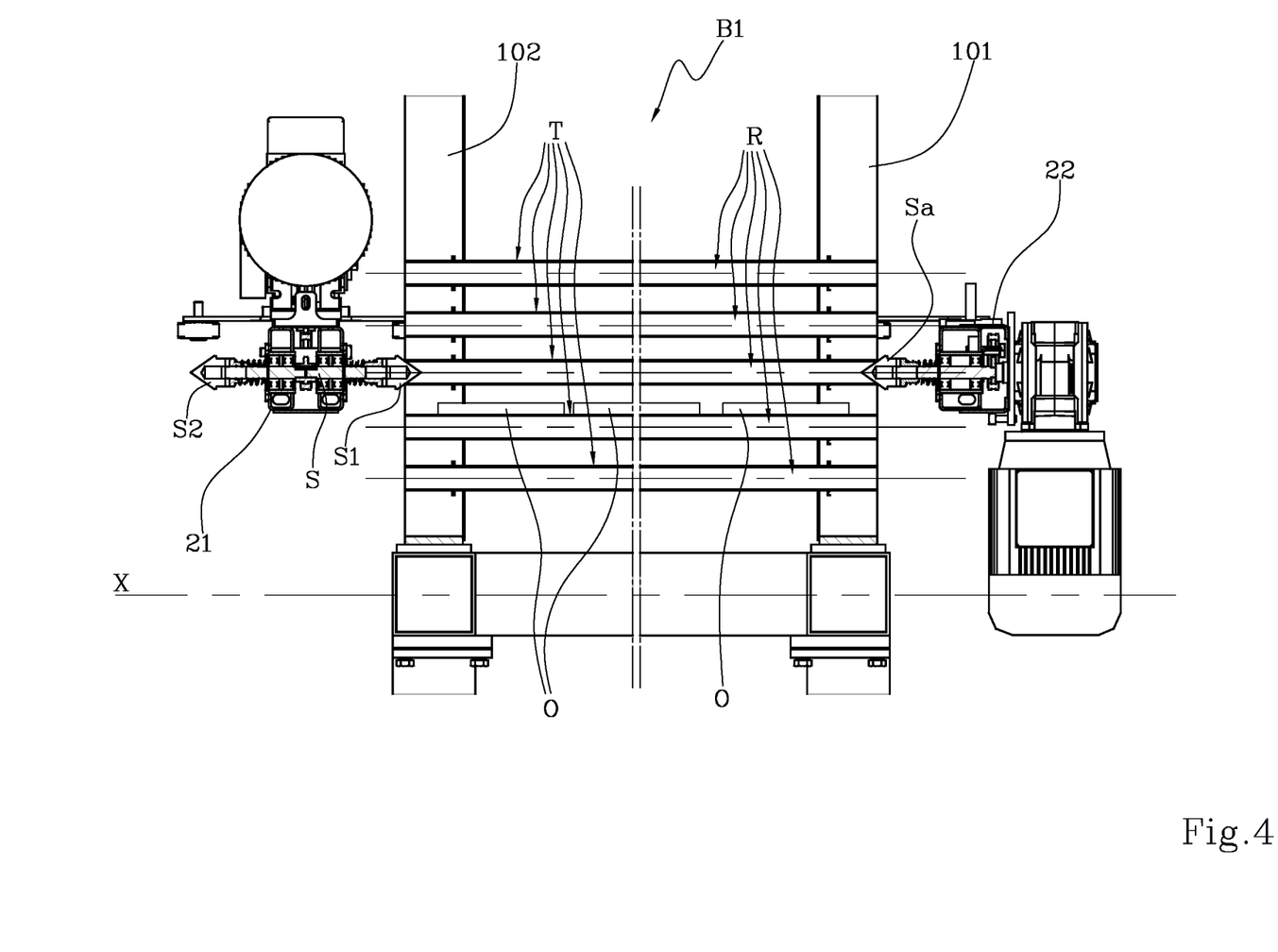
FIG. 4 is a section view, shown on a vertical plane, of a first roller box and some components of the device according to the present invention.
Figure 5:
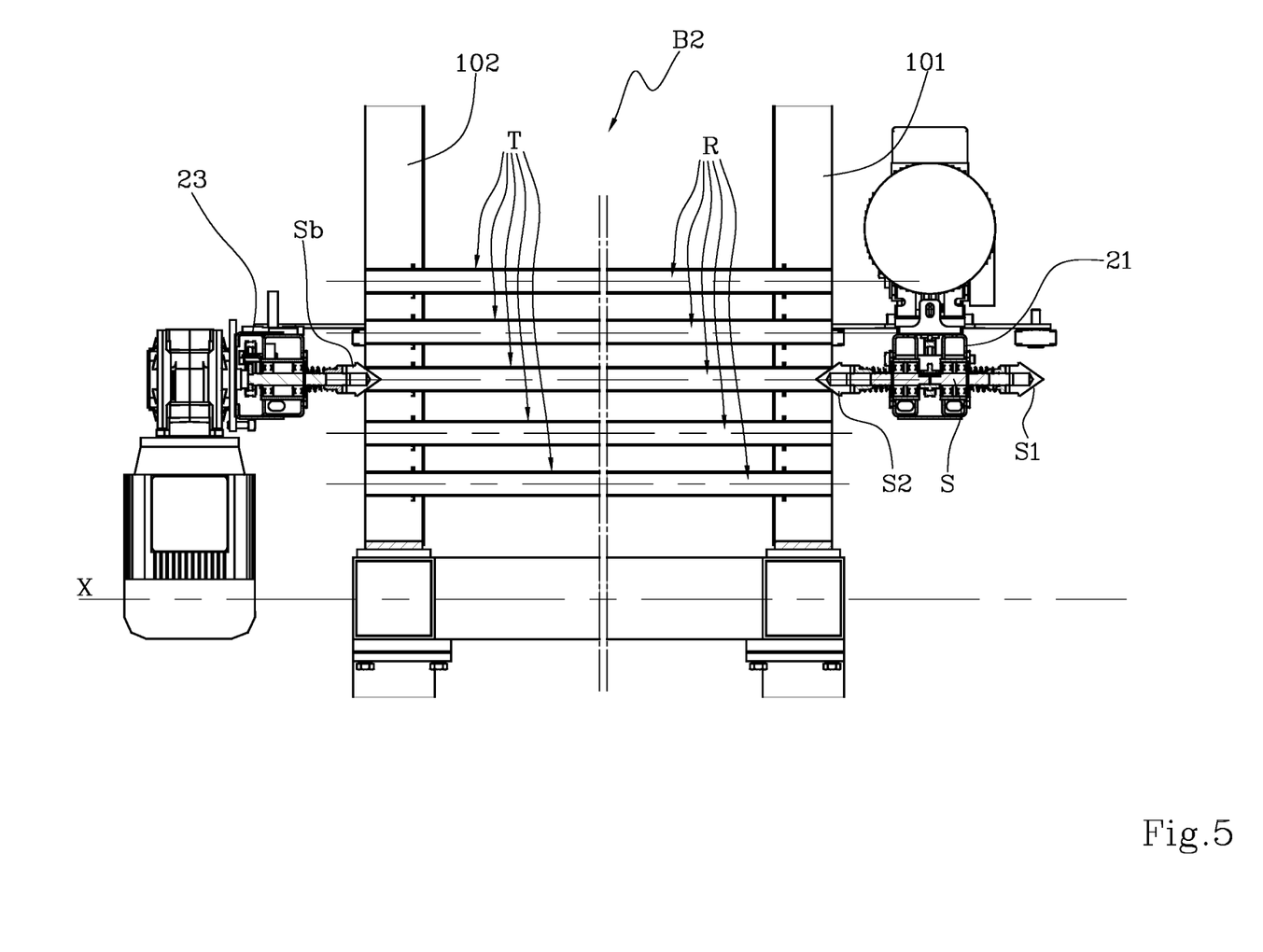
FIG. 5 is a section view, shown on a vertical plane, of a second roller box and some components of the device according to the present invention.

The side walls (101,102) support a plurality of rollers (R), arranged with horizontal rotation axes parallel to one another. The rollers (R) are distributed in groups within which they are arranged with the rotation axes thereof coplanar, so as to define a plurality of shelves (P). FIG. 1 shows only some rollers (R), located in the lower area of the box. In reality, there are as many rollers as there are pairs of seats distributed on the side walls (101,102). Each shelf (P) is therefore defined by a certain number of rollers (R) coplanar with one another and tangential to a horizontal conveyor plane (T) (FIG. 4).

Each roller (R) is supported at the ends thereof in through seats obtained through the side walls (101,102). In one possible embodiment, the ends of the rollers are coupled with a certain clearance within the respective seats, so that the rollers can rotate about the axis thereof if associated with a rotation motor. In an alternative embodiment, the ends of the rollers are coupled to the seats thereof by means of bearings or rolling bushings. In any case, the ends of the rollers (R) face the external side of the side walls (101,102) to be accessible to a kinematic drive mechanism, which will be better illustrated in the following description, structured to couple with the ends of the rollers and to drive the rollers in rotation.

The movement device for moving roller boxes according to the present invention comprises a support frame (10), movable along a vertical direction.

In the embodiment shown, preferred but not exclusive, the support frame (10) is vertically movable along a bearing structure (90), comprising a pair of uprights (91) to which the support frame (10) itself is slidably associated.

In particular, the support frame (10) is comprised between the two uprights (91). The two uprights (91) are joined at the top by a crossbar (92).

Motor means, within the reach of those skilled in the art, are interposed between the support frame (10) and at least one of the uprights (91), to allow the vertical sliding of the support frame (10). Guide and sliding means, within the reach of those skilled in the art, are associated with the uprights (91) and/or the support frame (10) to stably guide the support frame (10) in the vertical movement thereof.

Next to the support frame (10) and the bearing structure (90), the movement device comprises two operating stations (P1,P2) flanked to one another. Each operating station is structured to house a roller box. Each operating station is simply in the form of a free space for the positioning of a roller box, which can rest on the ground, or can be provided with a base or other structure for supporting a roller box. In the embodiment shown, the operating stations (P1,P2) are in the form of a free space provided with a base.

The movement device according to the present invention further comprises a conveyor plane (11), solidly constrained to the support frame (10) with respect to the movement in the vertical direction. The conveyor plane (11) is predisposed to translate objects (O) along a horizontal conveying direction (Y). In the embodiment shown, the conveyor plane (11) is in the form of a motorised roller conveyor, but could be obtained in other forms known to those skilled in the art. In addition, the conveyor plane (11) is movable with respect to the support frame (10) along a transversal direction (X), horizontal and perpendicular to the conveying direction (Y).

In the embodiment shown, the conveyor plane (11) is associated with a support frame thereof, to which motor means are constrained for operating the conveying plane (11) itself. The conveying plane support frame (11), in turn, is slidably constrained to the support frame (10) along the transversal direction (X).

The device according to the present invention comprises a main arm (21), solidly constrained to the support frame (10), which is provided with a drive mechanism, predisposed to couple with a plurality of coplanar rollers (R) defining a shelf (P). In a possible but not exclusive embodiment, illustrated in the figure, the drive mechanism comprises a plurality of spindle rollers (S), rotating about rotation axes which are coplanar, horizontal and perpendicular to the conveying direction (Y). Motor means, known to those skilled in the art, are predisposed for driving the rotation of at least some spindles (S).

The main arm (21) is provided with a motorised kinematic drive mechanism. This motorised kinematic drive mechanism is suitable for rotating the rollers (R) of a shelf (P) of a roller box. In the embodiment shown, the motorised kinematic drive mechanism comprises a plurality of spindles (S), driven in rotation by means known to those skilled in the art. The spindles (S) have two opposite ends (S1,S2), projecting from opposite sides of the main arm (21), so as to be able to couple with the rollers (R) of the two roller boxes (B1,B2) arranged on opposite sides of the main arm (21), as will be better illustrated below.

The main arm (21) is movable along the transversal direction (X) between a first operating position and a second operating position.

In the first operating position, the main arm (21) is displaced towards the first operating station (P1), so as to be able to engage the kinematic drive mechanism to the rollers of a shelf of a first roller box (B1). Essentially, in the first operating position, the main arm (21) is able to engage the kinematic drive mechanism thereof with the rollers of a shelf of the first box (B1) located in the first operating position (P1). Preferably, in the first operating position, the main arm (21) does not engage with the second box (B2). In the embodiment shown, each spindle (S) engages a first end (S1) with the end of a roller (R) of a shelf (P) of the first box (B1).

In the second operating position, the main arm (21) is displaced towards the second operating station (P2), so as to be able to engage the kinematic drive mechanism to the rollers (R) of a shelf (P) of a second roller box (B2) located in the second operating station (P2). Essentially, in the second operating position, the main arm (21) is able to engage the kinematic drive mechanism thereof with the rollers of a shelf of the second box (B2). Preferably, in the second operating position the main arm (21) does not engage with the first box (B1). In this case, each spindle (S) engages a second end (S2) with the end of a roller (R) of a shelf (P) of the second box (B2).

The conveyor plane (11) is movable along the transversal direction (X) to selectively align with the first operating station (P1) or with the second operating station (P2). In other words, the conveyor plane (11) is movable along the transversal direction (X) between a first position, located on one side of the main arm (21), in which it is placed in front of the first operating station (P1), and a second position, located on the opposite side of the main arm (21), in which it is placed in front of the second operating station (P2).

Figure 2:
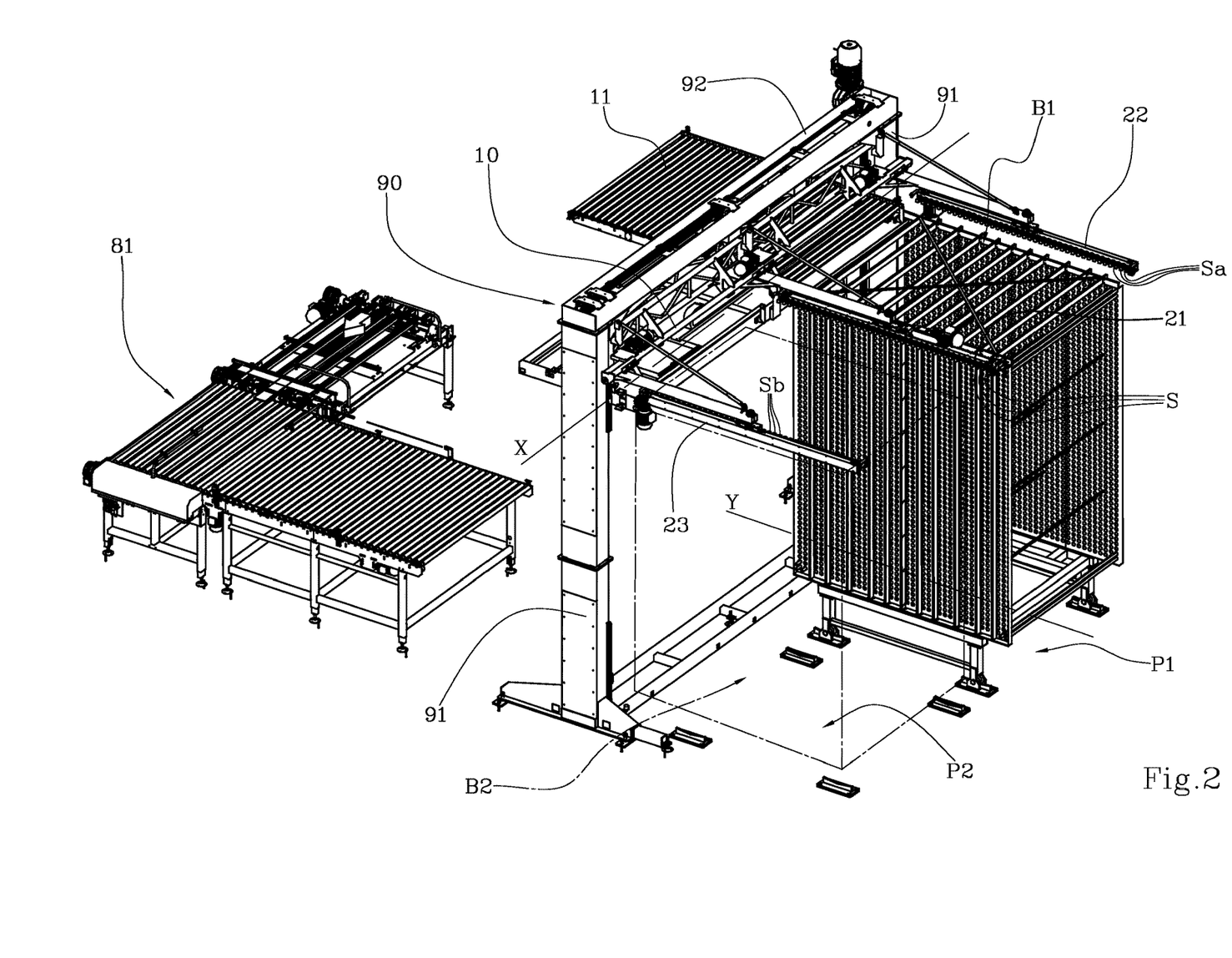
FIG. 2 is an isometric and schematic view of the movement device according to the present invention, in which there are two roller boxes of which one is depicted in dashed lines.
Figures 3, 3A:
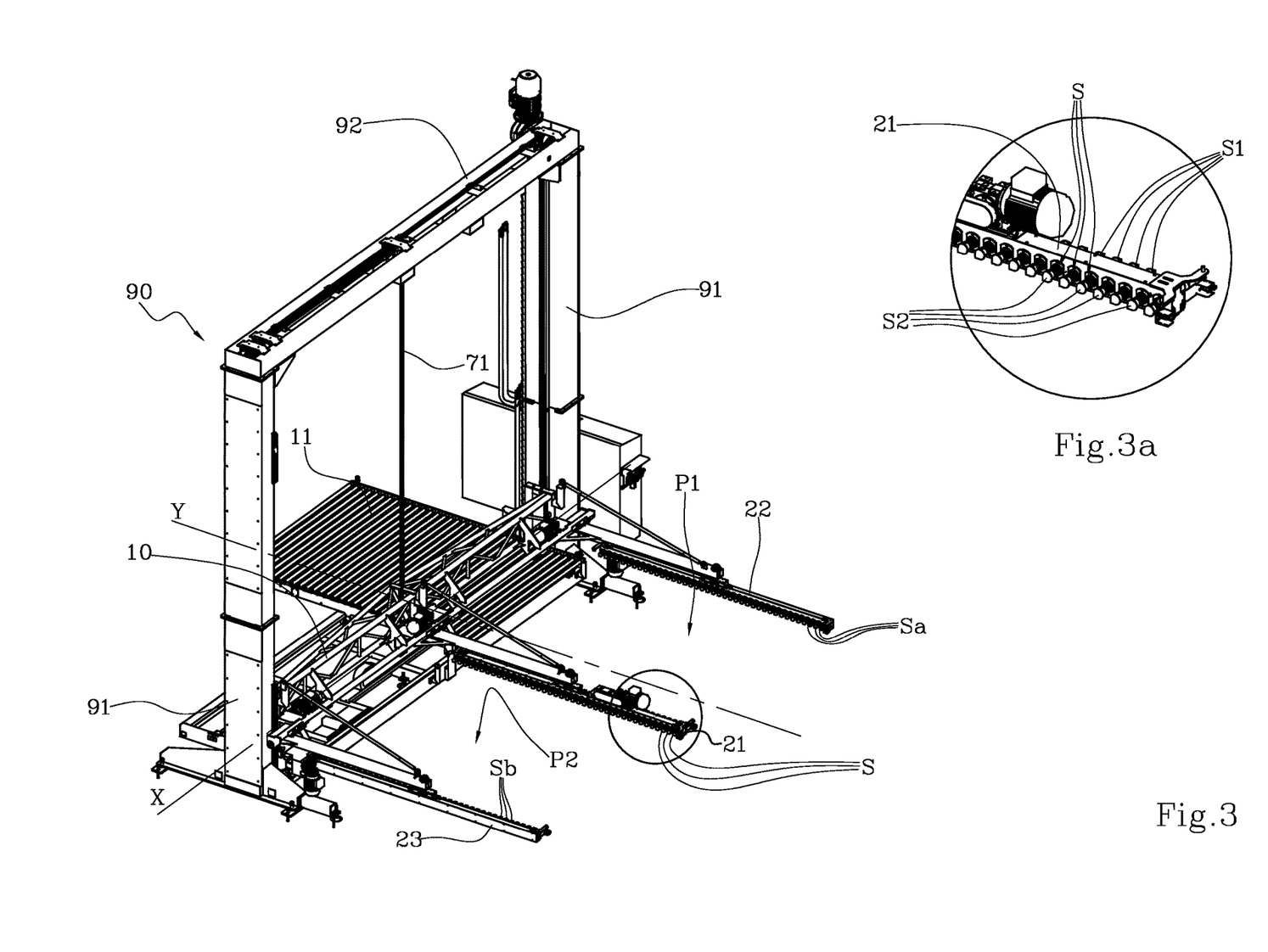
FIG. 3 is an isometric and schematic view of the device according to the present invention.
FIG. 3a is an enlargement of FIG. 3.

Furthermore, the conveyor plane (11) is arranged in proximity to the end of the main arm (21), solidly constrained to the support frame (10). In other words, the main arm (21) protrudes at one end of the conveyor plane (11). In FIGS. 2 and 3 the conveyor plane (11) is aligned with the main arm (21) and with the first operating station (P1) along the conveying direction (Y), so that the conveyor plane (11) and a shelf (P) of the first box (B1), engaged with the main arm (21) substantially form a single continuous conveyor plane.

In this way, when the main arm (21) engages and activates a shelf (P) of a roller box (B1,B2), the conveyor plane (11) is arranged coplanar and aligned with the conveyor plane defined by the rollers of the activated shelf, so that the objects can be transferred between the shelf and the conveyor plane (11) in one direction or the other, along the conveying direction (Y).

In practice, to operate on the first box (B1), i.e., to activate one of the roller shelves of the first box (B1), the device brings the main arm (21) in alignment with the shelf of the first box (B1) to be activated, through the vertical translation of the support frame (10). Once the desired alignment has been reached, the main arm (21) moves to the first operating position, so that the kinematic drive mechanism engages with the rollers of the shelf to be activated. In the solution shown, the motorised spindles (S) of the main arm (21) engage with the end of the rollers of the shelf to be activated facing the main arm (21). By activating the kinematic drive mechanism, in the case represented by the motorised spindles (S), for rotating the rollers of the shelf in one direction or the other, it is possible to transfer the objects on the shelf of the first box (B1), or move the objects away from the shelf of the first box (B1).

To operate on the second box (B2), the steps are the same as described above, with the difference that the main arm (21), having reached the desired shelf of the second box (B2), moves to the second operating position.

With only the main arm (21), the movement device according to the present invention is therefore able to operate on two roller boxes (B1,B2) arranged flanked to one another in the area of operation of the arm (21) itself.

In the embodiment shown, preferred but not exclusive, the device comprises a main arm (21), a first end arm (22) and a second end arm (23). This embodiment is particularly suitable for operating on roller boxes in which the rollers are inserted in the seats obtained through the side walls (101, 102) without the interposition of rolling members between the ends of the rollers and the seats themselves.

The operating arms (21,22,23) are substantially coplanar with one another, on the same horizontal plane, and are separated from each other by a distance such as to allow the positioning of a roller box (B1,B2) between two adjacent arms, as shown in FIG. 2. In essence, one roller box (B1) can be positioned between the main arm (21) and the first arm (22), another roller box (B2) can be positioned between the main arm (21) and the second arm (23).

The conveyor plane (11) is movable along the transversal direction (X) to selectively align with the first operating station (P1), thus with the first arm (22) and the main arm (21), or with the second operating station (P2), thus with the second arm (23) and the main arm (21). Furthermore, the conveyor plane (11) is arranged in proximity to an end of the operating arms (21,22,23) facing or solidly constrained to the support frame (10). In other words, the operating arms (21,22,23), when aligned with the conveyor plane (11), protrude at one end of the latter. In FIGS. 2 and 3 the conveyor plane (11) is aligned with the main arm (21) and with the first arm (22) along the conveying direction (Y), so that the conveyor plane (11) and a shelf (P) of the first box (B1) engaged with the two arms (21,22) substantially form a single continuous conveyor plane.

In this way, when the operating arms (21,22,23) engage and activate a shelf (P) of a roller box (B1,B2), the conveyor plane (11) is arranged coplanar and aligned with the conveyor plane defined by the rollers of the activated shelf, so that the objects can be transferred between the shelf and the conveyor plane (11) in one direction or the other, along the conveying direction (Y).

The external operating arms (22,23) are movable in the transversal direction (X) between an active position and an inactive position.

In the active position, the external arm (22) is displaced towards the main arm (21). Similar to the main arm, the first external arm (22), in the active position, is able to engage the kinematic drive mechanism thereof with the rollers of a shelf of the first box (B1). In particular, in the embodiment shown, each spindle (Sa) of the first external arm (22) engages the end thereof with the end of an opposite roller (R) with respect to the end engaged by the spindle (S) of the main arm (21). In the inactive position, the first external arm (22) is located at a greater distance from the main arm (21) with respect to the active position. In the inactive position, the first external arm (22) is not able to engage the kinematic drive mechanism thereof with the rollers of a shelf of the first box (B1). In other words, in the inactive position, the spindles (Sa) are offset from the rollers of the first box (B1).

In the active position, the second external arm (23) is displaced towards the main arm (21). Similar to the main arm, the second external arm (23), in the active position, is able to engage the kinematic drive mechanism thereof with the rollers of a shelf of the second box (B2). In particular, in the embodiment shown, each spindle (Sb) of the second external arm (23) engages the end thereof with the end of an opposite roller (R) with respect to the end engaged by the spindle (S) of the main arm (21). In the inactive position, the second external arm (23) is located at a greater distance from the main arm (21) with respect to the active position. In the inactive position, the second external arm (23) is not able to engage the kinematic drive mechanism thereof with the rollers of a shelf of the second box (B2). In other words, in the inactive position, the spindles (Sb) are offset from the rollers of the second box (B2).

With only three operating arms, the movement device according to the present invention is therefore able to operate on two roller boxes (B1,B2) arranged flanked to one another in the area of operation of the operating arms themselves.

In practice, to operate on the first box (B1), i.e., to activate one of the roller shelves of the first box (B1), the device brings the operating arms in alignment with the shelf of the first box (B1) to be activated, through the vertical translation of the support frame (10). Once the desired alignment has been reached, the main arm (21) moves to the first operating position, so that the kinematic drive mechanism engages with the rollers of the shelf to be activated, while the first arm (22) moves to the active position. In the solution shown, the motorised spindles (S) of the main arm (21) engage with the end of the rollers of the shelf to be activated facing the main arm (21), while the spindles (Sa) of the first arm (22) engage with the opposite ends of the rollers of the shelf to be activated. By activating the kinematic drive mechanism, in the case represented by the motorised spindles (S), for rotating the rollers of the shelf in one direction or the other, it is possible to transfer the objects on the shelf of the first box (B1), or move the objects away from the shelf of the first box (B1).

To operate on the second box (B2), the steps are the same as described above, with the difference that the main arm (21), having reached the desired shelf of the second box (B2), moves to the second operating position and the second arm (23) moves to the active position.

In one possible embodiment, the drive mechanisms of all the operating arms (21,22,23) can be motorised, or the drive mechanism of the main arm (21) alone could be motorised. In a further possible embodiment, the drive mechanisms could be idle, i.e., perform the function of rotating support for the rollers (R) which could be driven in rotation by other means.

Preferably, the main arm (21) can assume a neutral position, intermediate between the first and second operating positions along the transversal direction (X). In the neutral position, the main arm (21) is located so as not to engage with either of the two roller boxes (B1, B2). With the main arm (21) in neutral position and the first and second arms (22,23) in inactive position, the roller boxes can be introduced and extracted in the two operating stations (P1,P2) without interfering with the operating arms (21,22,23).

As already illustrated, the conveyor plane (11) is associated with the support frame (10) to align selectively with the first arm (22) and the main arm (21), or with the second arm (23) and the main arm (21), i.e., so as to be able to align with the rollers of the shelf to be activated. In the solution depicted, the conveyor plane (11) is coplanar to the rotation axes of the spindles (S). In this way, when the operating arms (21,22,23) engage and activate a shelf, the conveyor plane (11) is arranged coplanar with the conveyor plane defined by the rollers of the activated shelf, so that the objects can be transferred between the shelf and the conveyor plane (11) in one direction or the other, along the conveying direction (Y).

The support frame (10) is vertically movable between at least a first position, in which the conveyor plane (11) is coplanar with a supply/unloading line (81) for the objects, and a plurality of loading/unloading positions, in each of which the operating arms (21,22,23) are located with the spindles (S) coplanar and aligned to the rotation axes of the rollers of a shelf of a roller box (61,62).

Essentially, through the vertical displacement of the support frame (10), the conveyor plane (11) can be positioned at the height of a supply/unloading line (81) of the objects to be moved. By translating along the transversal direction (X), the conveyor plane (11) can align with the line (81) and receive from the line (81), or unload onto the line (81), a certain number of objects (O).

In the first case, the conveyor plane (11), after receiving the objects (O) from the line (81), is brought to the height of a shelf of a roller box (B1,B2), by translating the support frame (10). In addition, the conveyor plane (11), translating with respect to the support frame (10) along the transversal direction (X), aligns with the roller box (B1,B2) whose shelf is intended to receive the objects (O) present on the conveyor plane (11). As already illustrated, once the alignment with the shelf of the envisaged roller box (B1,B2) has been reached, the main arm (21) is displaced to the first or second operating position, simultaneously activating the displacement of the first or second arm (22,23) in the active position, depending on the box to be used, so that the kinematic drive mechanism engages with the rollers of the shelf to be activated. By activating the kinematic drive mechanism for the rotation of the rollers of the shelf and, in a same direction, the conveyor plane (11), it is possible to transfer the objects from the conveyor plane (11) to the roller box shelf. With an inverse sequence to that described, it is possible to remove the objects present on a shelf of a roller box, transferring them to the conveyor plane (11) and from the latter to the line (81).

Preferably, the movement device comprises a counterweight system, connected to the support frame (10) to at least partly support the weight associated to the support frame (10). In one possible embodiment, the counterweight system comprises a flexible element (71), for example a rope or a flexible chain, which, at one end, is constrained to the support frame (10), while at the other end it is constrained to a mass of predetermined weight. The mass can be slidable within one of the uprights (91). The flexible element (71) is associated with a central area of the support frame (10), to support the support frame (10) in a substantially barycentric area. By means of at least two return members, for example pulleys or idle toothed wheels, the flexible element is guided along a C-path from the point of attachment to the support frame (10) to the mass enclosed in an upright (91). The return elements are arranged so that a horizontal section of the flexible element (71) is contained in the crossbar (92), and so that a vertical section, which joins the mass, is contained in the corresponding upright (91).

The use of a counterweight system allows to lighten the load on the motor means used to lift the support frame (10), i.e., to displace the support frame (10) upwards.

The movement device according to the present invention allows the drawbacks of the current devices to be solved.

In fact, the presence of a single main arm (21), which can be activated to interact with one of the two boxes (61,62) flanked to one another, allows to reduce the total number of operating arms to three, and therefore to significantly reduce the total weight associated with the support frame (10). This reduces the complexity of the movement device. In addition, the lower weight associated with the support frame (10) reduces the energy required to displace the support frame and the operating arms (21,22,23) upwards.

The invention claimed is:

1. A movement device for moving roller boxes, comprising:
   a support frame (10), movable along a vertical direction;
   a conveyor plane (11), solidly constrained to the support frame (10) with respect to the movement in the vertical direction and movable with respect to the support frame (10) along a horizontal transversal direction (X), wherein the conveyor plane (11) is predisposed to translate objects (O) along a horizontal conveying direction (Y);
   two operating stations (P1, P2) flanked to one another, each of which is structured to house a roller box (B1, B2);
   characterised in that:
   it comprises a main arm (21), solidly constrained to the support frame (10), which is provided with spindles (S) rotating about rotation axes that are coplanar, horizontal and perpendicular to the conveying direction (Y);
   the main arm (21) is movable along the transversal direction (X) between a first operating position and a second operating position;
   in the first operating position, the main arm (21) is moved towards a first operating station (P1) so as to be able to engage with the rollers of a shelf of a first roller box (B1);
   in the second operating position, the main arm (21) is moved towards a second operating station (P2), so as to be able to engage with the rollers of a shelf of a second roller box (B2).

2. The movement device according to claim 1, comprising:
   two external operating arms (22, 23), solidly constrained to the support frame (10), each of which is provided with spindles (S) rotating about rotation axes that are coplanar, horizontal and perpendicular to the conveying direction (Y), each of which is movable along the transversal direction (X) between an active position and an inactive position;
   when in the active position thereof, one external arm (22, 23) is located at a shorter distance from the main arm (21) and is able to engage with the rollers of a shelf of a respective roller box (B1, B2);
   when in the inactive position thereof, one external arm (22, 23) is located at a greater distance from the main arm (21) with respect to the active position, and is not able to engage with the rollers of a shelf of a respective roller box (B1, B2).

3. The movement device according to claim 1, wherein the main arm (21) is predisposed to assume a neutral position, intermediate between the first and the second operating position along the transversal direction (X), in which the main arm (21) is located so as not to engage with either of the two roller boxes (B1, B2).

4. The movement device according to claim 1, wherein the conveyor plane (11) is coplanar to the rotation axes of the spindles (S).

5. The movement device according to claim 1, wherein the conveyor plane (11) is movable along the transversal direction (X) in order to selectively align with the first operating station (P1) or with the second operating station (P2).

6. The movement device according to claim 1, wherein the conveyor plane (11) is arranged in proximity to one end of the main arm (21).

7. The movement device according to claim 1, comprising a counterweight system, connected to the support frame (10) to at least partly support the weight associated to the support frame (10).

8. The movement device according to claim 7, wherein the counterweight system comprises a flexible element (71) which, at one end, is constrained to the support frame (10), while at the other end it is constrained to a mass of predetermined weight.

9. The movement device according to claim 1, comprising a supply/unloading line (81), arranged to supply/receive the objects to/from the conveyor plane (11).

10. The movement device according to claim 1, wherein the support frame (10) is vertically movable between at least a first position, in which the conveyor plane (11) is coplanar to a supply/unloading line (81) for the objects, and a plurality of loading/unloading positions, in each of which the main arm (21) is located with the spindles (S) coplanar and aligned to the rotation axes of the rollers of a shelf of a roller box (B1, B2).

11. The movement device according to claim 1, wherein the support frame (10) is vertically movable along a bearing structure (90), comprising a pair of uprights (91) to which the support frame (10) is slidably associated.

12. The movement device according to claim 2, wherein the main arm (21) is predisposed to assume a neutral position, intermediate between the first and the second operating position along the transversal direction (X), in which the main arm (21) is located so as not to engage with either of the two roller boxes (B1, B2).

13. The movement device according to claim 2, wherein the conveyor plane (11) is coplanar to the rotation axes of the spindles (S).

14. The movement device according to claim 2, wherein the conveyor plane (11) is movable along the transversal direction (X) in order to selectively align with the first operating station (P1) or with the second operating station (P2).

15. The movement device according to claim 2, wherein the conveyor plane (11) is arranged in proximity to one end of the main arm (21).

16. The movement device according to claim 2, comprising a counterweight system, connected to the support frame (10) to at least partly support the weight associated to the support frame (10).

17. The movement device according to claim 2, comprising a supply/unloading line (81), arranged to supply/receive the objects to/from the conveyor plane (11).

18. The movement device according to claim 2, wherein the support frame (10) is vertically movable between at least a first position, in which the conveyor plane (11) is coplanar to a supply/unloading line (81) for the objects, and a plurality of loading/unloading positions, in each of which the main arm (21) is located with the spindles (S) coplanar and aligned to the rotation axes of the rollers of a shelf of a roller box (B1, B2).

19. The movement device according to claim 2, wherein the support frame (10) is vertically movable along a bearing structure (90), comprising a pair of uprights (91) to which the support frame (10) is slidably associated.

* * * * *